United States Patent
Secondari

(10) Patent No.: US 6,332,487 B1
(45) Date of Patent: Dec. 25, 2001

(54) TIRE WITH CARCASS CORD ANGLE IN CROWN REGION DIFFERENT THAN IN SIDEWALL REGION

(75) Inventor: Francesco Secondari, Madison, AL (US)

(73) Assignee: Dunlop Tire Corporation, Buffalo, NY (US)

( * ) Notice: Subject to any disclaimer, the term of this patent is extended or adjusted under 35 U.S.C. 154(b) by 0 days.

(21) Appl. No.: 09/305,458

(22) Filed: May 6, 1999

(51) Int. Cl.[7] ................ B60C 9/04; B60C 9/07; B60C 15/00
(52) U.S. Cl. ............. 152/554; 152/548; 152/562
(58) Field of Search ................... 152/548, 552, 152/554, 562

(56) References Cited

U.S. PATENT DOCUMENTS

| | | | |
|---|---|---|---|
| 3,286,758 | * 11/1966 | Svereckis et al. | 152/554 |
| 3,760,858 | * 9/1973 | Grossett | 152/554 X |
| 4,096,899 | * 6/1978 | Kitazawa et al. | 152/554 X |

FOREIGN PATENT DOCUMENTS

| | | | |
|---|---|---|---|
| 1 052 117 A2 | * 11/2000 | (EP) . | |
| 56-135304 | * 10/1981 | (JP) | 152/562 |
| 2-144201 | * 6/1990 | (JP) | 152/562 |
| 4-31106 | * 2/1992 | (JP) | 152/554 |

* cited by examiner

Primary Examiner—Adrienne C. Johnstone
(74) Attorney, Agent, or Firm—Birch, Stewart, Kolasch & Birch, LLP

(57) ABSTRACT

A pneumatic tire having simplified structure and improved properties has mono-ply carcass having ply turn-ups closely wrapped around the bead hoop and extended to underlie breaker edges and the carcass cord angle in crown region is substantially radial at 85°–90° to the circumferential direction whereas in the sidewall region the cord angles of the main carcass ply portion and the turn-up portion are at a lower angle of 65°–85° and are crossed with respect to each other.

6 Claims, 1 Drawing Sheet

TIRE WITH CARCASS CORD ANGLE IN CROWN REGION DIFFERENT THAN IN SIDEWALL REGION

BACKGROUND OF THE INVENTION

1. Field of the Invention

The present invention relates to pneumatic tires and particularly to belted tires having a mono-ply carcass construction.

2. Description of Related Art

Conventional pneumatic tires comprise a tire carcass extending between two wheelrim contacting bead portions, through sidewall portions to a ground contacting tread portion. The tire carcass is conventionally reinforced by one or more plies of cord reinforced tire fabric extending continuously from bead to bead.

The ground contacting tread region is further reinforced between tread edges by a circumferentially extending annular hoop-like belt or breaker comprising a plurality of plies of cord reinforced rubber fabric disposed radially outwardly of the carcass ply and inwardly of the tread rubber.

To provide anchorage in each bead region the carcass ply is turned around an annularly extending inextensible bead hoop, and thereafter is extended radially outwardly towards the mid-sidewall.

Disposed between the carcass ply main portion and the thus formed carcass ply turn-up portion is a hard rubber apex.

BRIEF SUMMARY OF THE INVENTION

A pneumatic tire comprising a carcass ply extending in a main portion between bead regions through sidewall regions and a crown region radially inward of a ground contacting tread and a tread reinforcing breaker, the carcass ply in each bead region being turned closely around an annularly extending inextensible bead core from the axially inside to the outside and thereafter being extended radially outwardly to form a ply turn-up portion overlying the carcass main portion the ply turn-up portion extending outwardly to underlie the axial edge of the breaker, the carcass ply being reinforced by a plurality of mutually parallel carcass cords, wherein the carcass ply cords in the crown region are disposed at an angle in the range of 85°–90° to the tire circumferential direction and the cords in the sidewall regions are disposed at a smaller angle than the cords in the crown region being at an angle in the range of 85°–90° to the tire circumferential direction and the cords in the sidewall regions are disposed at a smaller angle than the cords in the crown region being at an angle in the range of 65°–85° to the tire circumferential direction and the cords in the carcass main portion and those of the carcass turn-up portion are crossed with respect to each other.

Preferably the carcass turn-up portion overlaps the breaker edge by a distance of 5–30% most preferably 10–20% of the axial width of the breaker.

The change of angle of the carcass cords from the crown to the sidewall region is in the edge region of the breaker.

BRIEF DESCRIPTION OF DRAWINGS

Further aspects of the invention will become apparent from the following description by way of example only of one embodiment and the following drawing in which.

DETAILED DESCRIPTION OF THE INVENTION

Figure 1:
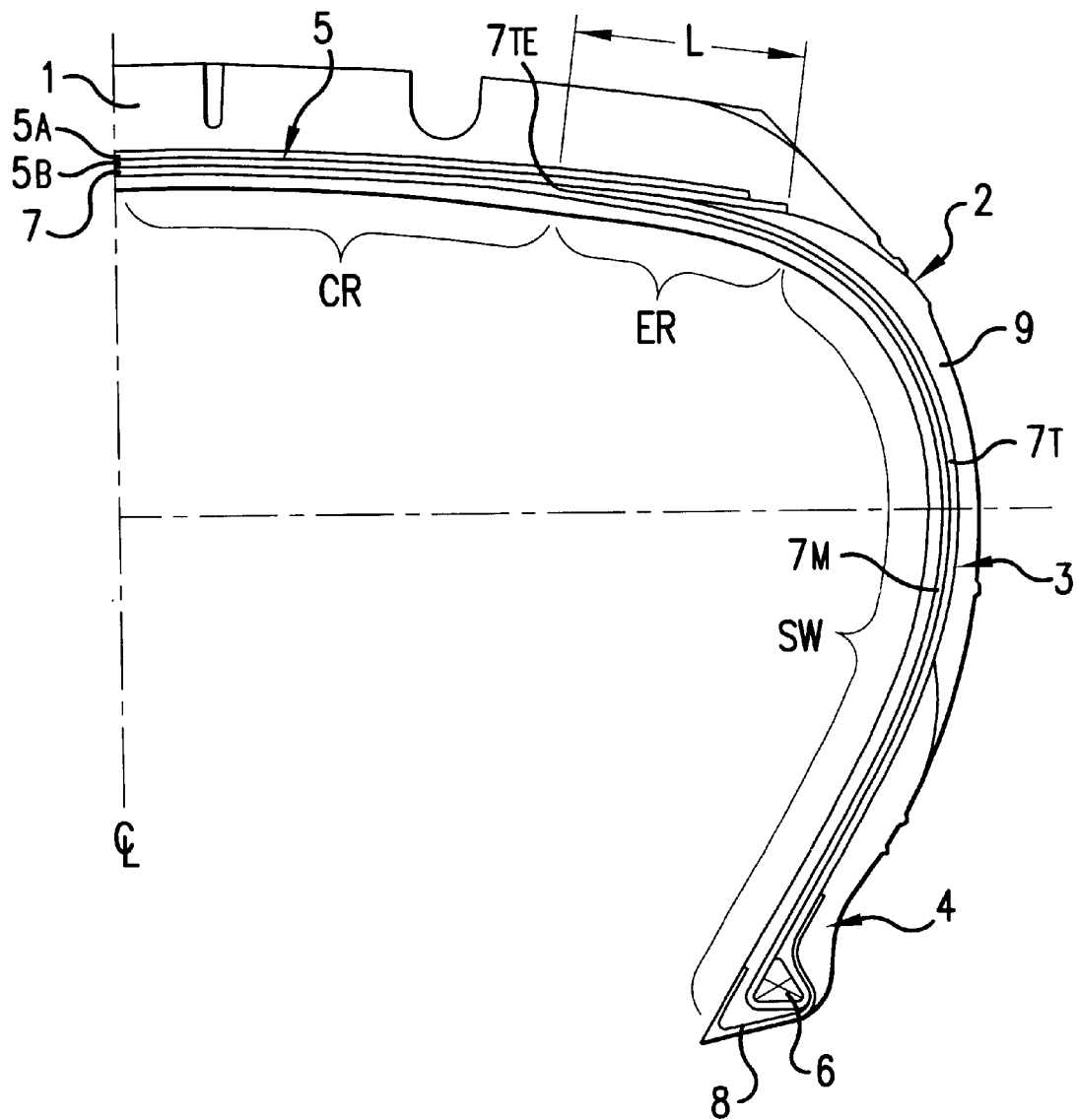
FIG. 1 shows a schematic cross-section diagram of one half of a tire in accordance with the invention.

Shown in FIG. 1 is a cross-section of one half of a 205/60 R15 passenger car tire according to the present invention.

The tire has a ground contacting tread 1 extending between tread edges 2 connected to radially inwardly extending sidewalls 3 terminating in bead regions 4 for mounting on a wheelrim (not shown).

The tread is reinforced by a belt or breaker assembly 5 comprising two centrally disposed plies 5A and 5B. Carcass ply 7 comprises cord reinforced rubber fabric. The cords are polyester but may comprise any of the conventional tire fabric materials such as rayon, aramid or metal cords.

In each bead region, the carcass ply 7 is turned closely around the annular bead hoop 6 from the axial inside to the outside and thereafter is extended in turn-up portions 7T radially outwardly. As can be seen the carcass ply turn-up portions 7T lie immediately adjacent to and axially outward of the carcass ply main portion 7M extending between the beads. The turn-up portions 7T extend radially outwardly through the whole length of the tire sidewall 3 such that the ply turn-up end 7TE underlies the breaker assembly 5. The end of the turn-up 7T overlaps the breaker edge by a distance L of 30 mm, which is 17.6% of the effective breaker width. The overlap must be in the range of 5 to 30% of the breaker width, preferably 10% to 20%.

Turning again to the cords of the carcass ply.

In the crown region of the tire, denoted by CR in FIG. 1, the cords of the carcass ply 7 are breaker edge by a distance L of 30 mm, which is 17.6% of the effective breaker width. The overlap must be in the range of 5 to 30% of the breaker width, preferably 10% to 20%.

Turning again to the cords of the carcass ply.

In the crown region of the tire, denoted by CR in FIG. 1, the disposed substantially radially, that is at an angle of 85°–90° to the circumferential direction of the tire.

In contrast, in the sidewall region of the tire, denoted by SW in FIG. 1, the carcass ply cords are disposed at a lower angle than in the crown region CR, being in the range of 65°–85° to the tire circumferential direction. In this sidewall region both the cords of the carcass ply main portion 7M and the turn-up portion 7T are disposed at this angle but they are crossed with respect to each other.

In the region ER of the carcass at the breaker edge between the crown region CR and the sidewall region SW the carcass cord line is curved as the angle of the carcass cords changes progressively from the higher value in the crown CR to the lower value in the sidewall region SW. This transition is positioned in the region of the overlap of the turn-up with the breaker at the breaker edge.

As is clearly evident in the bead of the tire the carcass ply turn-up 7T is wrapped closely around the bead hoop 6 and thereafter overlies the radially outer side of the carcass main part 7M so that there is no conventional bead apex between the two. This gives a relatively narrow bead of reduced sectional area and weight.

The bead is also provided with a textile reinforced chafer strip 8 which extends along the bead surface from the inside of the tire, along the radially inner part of the bead at the bead base and thereafter is wrapped closely around the bead coil 6 overlying the radially outer side of the ply turn-up 7T.

In a further feature of the tire, the sidewall rubber 9 overlying the radially outer portion of the turn-up portion 7M is extended into the tread region to also underlie the breaker edge.

The crossed cords in the sidewall regions of the present tire have proved to give better resistance to the onset of the so-called "standing wave phenomenon" and thus give improved high speed durability of the tire structure.

The tire of the invention may be readily manufactured in a conventional two-stage process employing firstly an expandable/collapsible cylindrical former and subsequently a toroidal shaping former.

In the first stage a cylinder of bias-cut carcass fabric is formed on the expandable former. The ply cylinder has cords extending between the ply edges at an angle of 65°–85° to the former axial direction.

In a conventional manner bead hoops are assembled onto the carcass ply cylinder and the edges of the ply fabric are turned up and around the bead hoop to subsequently overlie the radially outer surface of the carcass ply between the hoops.

In the second stage of manufacture the cylindrical assembly including carcass ply fabric and bead hoops is deformed into a toroidal shape by expanding the central part of the cylinder assembly radially outwardly and simultaneously drawing the edges of the cylinder axially inwardly. During this process the tension created in the carcass cords is sufficient to deform and reduce the cord angle of the carcass cords in the central region, which are between the turn-up regions, from their original bias angle of 65°–85° to become substantially radially aligned at 85–90°, thus giving the cord angle configuration of the present invention.

As described above the tire of the present invention provides a simplified structure which gives excellent tire properties.

Having described my invention what I claim is:

1. A pneumatic tire comprising a carcass ply extending in a main portion between bead regions through sidewall regions and a crown region radially inward of a ground contacting tread and a tread reinforcing breaker, the carcass ply in each bead region being turned closely around an annularly extending inextensible bead core from the axially inside to the outside and extending radially outwardly to form a ply turn-up portion overlying the carcass main portion, the ply turn-up portion extending outwardly to underlie the axial edge of the breaker, the carcass ply being reinforced by a plurality of mutually parallel carcass cords, wherein the carcass ply cords in the crown region are disposed at an angle in the range of 85°–90° to the tire circumferential direction, the cords in the sidewall regions are disposed at a smaller angle than the cords in the crown region being at an angle in the range of 65°–85° to the tire circumferential direction, the cords in the carcass main portion and those of the carcass turn-up portion are crossed with respect to each other, and wherein the ply turn-up underlies the axial edge of the breaker in the range of 10 to 20% of the width of the breaker.

2. A tire according to claim 1, wherein the transition zone between the carcass cord angle in the crown region and the carcass cord angle in the sidewall region is in the edge region of the breaker.

3. A tire according to claim 1, wherein the carcass turn-up portion lies adjacent to the carcass main portion over the whole length of the turn-up portion such that no bead apex component is present between the two.

4. A tire according to claim 1, wherein a textile reinforced chafer is disposed in the bead region extending from the axially inside of the bead, along the radially innermost bead base and overlying the ply turn-up portion on its axially outer side.

5. A tire according to claim 1, wherein a sidewall rubber component overlying the ply turn-up portion on its radially outer side extends to underlie the breaker edge.

6. A tire according to claim 1, wherein the carcass ply cords in the crown region are disposed at an angle of 90° to the tire circumferential direction.

* * * * *